United States Patent [19]

Greenhalgh

[11] 4,069,286

[45] Jan. 17, 1978

[54] METHOD OF THERMALLY CURING POLYMERIC MATERIALS

[75] Inventor: Milton Sharples Greenhalgh, Fairfield, CT

[73] Assignee: General Electric Company, New York, N.Y.

[21] Appl. No.: 656,448

[22] Filed: Feb. 9, 1976

Related U.S. Application Data

[63] Continuation-in-part of Ser. No. 493,680, Aug. 1, 1974, abandoned, which is a continuation-in-part of Ser. No. 310,636, Nov. 29, 1972, abandoned.

[51] Int. Cl.² .............................................. B29C 25/00
[52] U.S. Cl. ...................................... 264/85; 34/156; 264/174; 264/236; 264/347; 425/113; 432/8
[58] Field of Search ........... 264/85, 25, 176 F, 176 R, 264/236, 347, 174; 425/113, 72; 34/156; 432/8

[56] References Cited

U.S. PATENT DOCUMENTS

| 1,757,053 | 5/1930 | Minor | 264/347 |
| 2,635,293 | 4/1953 | Prance | 264/236 |
| 3,024,492 | 3/1962 | Antolino | 264/347 |
| 3,346,247 | 10/1967 | Talalay et al. | 264/347 |
| 3,513,228 | 5/1970 | Miyauchi et al. | 264/174 |
| 3,645,656 | 2/1972 | Stauffer et al. | 425/113 |
| 3,739,491 | 6/1973 | Creapo et al. | 34/156 |
| 3,846,528 | 11/1974 | Christman et al. | 264/174 |

OTHER PUBLICATIONS

Lupke, Jr., Vulcanization Temperature Control, R. T. Vanderbilt Rubber Handbook, 1958, pp. 402 et seq.
"The Continuous Vulcanization of Solid and Cellular Profiles," Gregory, Rubber Journal, 9-1966, pp. 66-74.

Primary Examiner—Jeffery R. Thurlow
Attorney, Agent, or Firm—R. G. Simkins; P. L. Schlamp; F. L. Neuhauser

[57] ABSTRACT

A method of continuously and rapidly effecting a heat induced cure in curable polymeric compositions, such as by cross-linking or vulcanization, by means of directly contacting a surface of the heat curable polymeric composition with a stream of hot gas traveling at very high velocities, and under elevated pressures.

38 Claims, 5 Drawing Figures

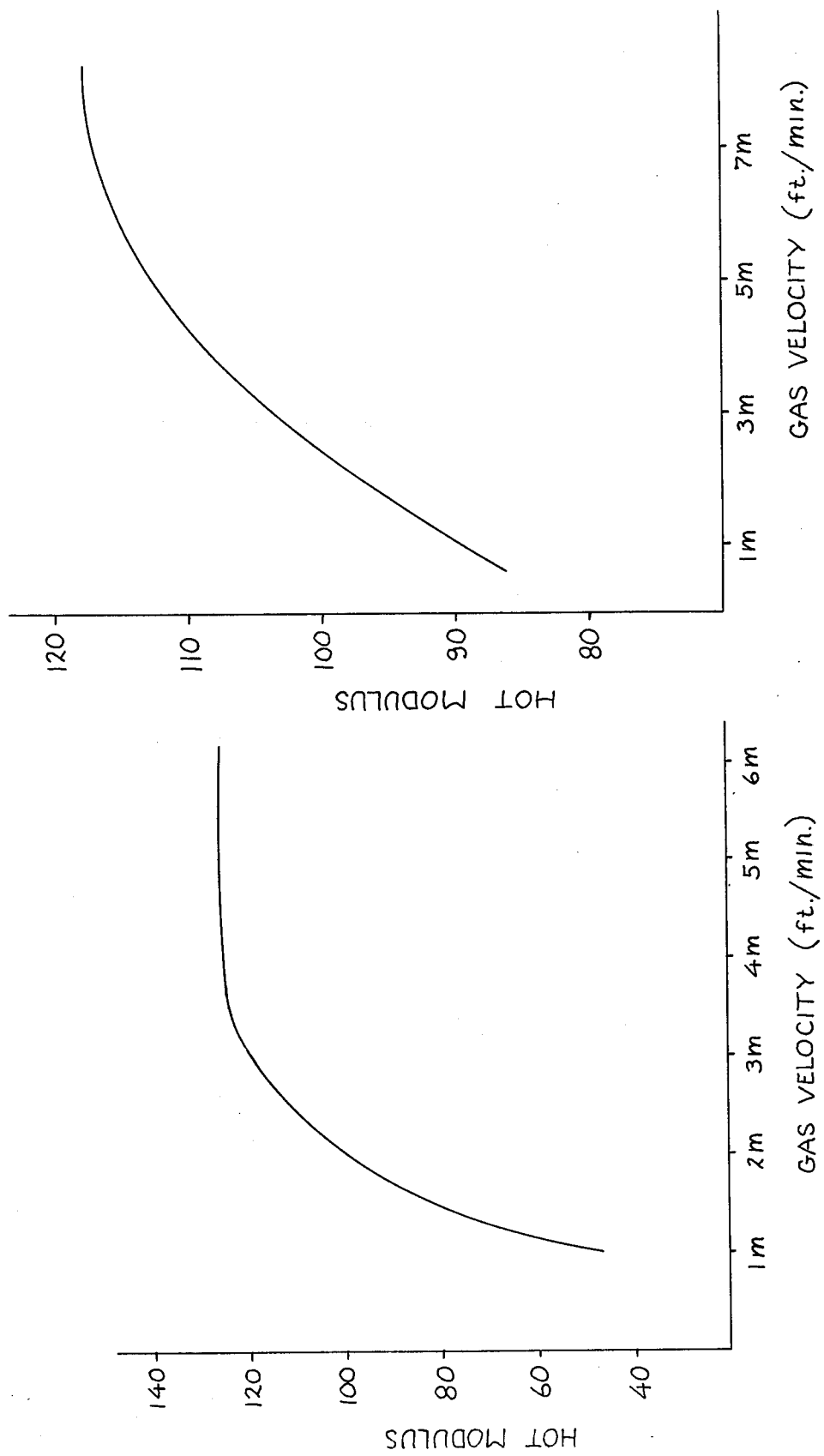

METHOD OF THERMALLY CURING POLYMERIC MATERIALS

This application is a continuation-in-part of my copending application for patent, Ser. No. 493,680, filed Aug. 1, 1974, of the same title, now abandoned, which in turn is a continuation-in-part application of my then copending, but now abandoned, application for patent, Ser. No. 310,636, filed Nov. 29, 1972, of the same title.

BACKGROUND OF THE INVENTION

The growth and magnitude of the rubber and plastics industry and the expansion of the number and kinds of products and articles formed from the many curable or thermosettable polymeric materials developed has prompted extensive efforts directed to accelerating the rate and improving the efficiency of effecting high temperature induced cures such as the common vulcanization and cross-linking of elastomers and polymers.

Steam, the traditional heating medium in most commercial vulcanization and other heat induced polymeric curing processes, as is well-known, inherently involves progressively disproportionally greater increases in pressure for increases in its temperature, which in turn requires expensive and massive confining measures for its generation, transmission and application in order to hasten curing procedures by increasing steam temperatures. Also, the high pressure conditions incurred with high temperature steam drives the ambient water vapor of the steam atmosphere into the polymeric material which often necessitates a post curing drying operation to thereafter expel this moisture from the products formed therefrom.

Moreover, the rate of carrying out or completing heat induced curing processes for curable organic polymeric materials is especially significant when the manufacturing procedure is of a continuous nature with respect to both the production facility and product formation, such as with the continuous extrusion molding or forming of articles or products of interminable length, exemplified by hose or tubing and insulation covered wire or cable. When such a product of extended length is continuously formed, with a curable polymeric material, the molding or forming and curing operations are best continuously carried out in an uninterrupted tandem sequence. However, the time requirements for increasing the temperature throughout a moving mass of polymeric material up to its curing temperature conditions for most cure systems are normally considerably longer than the time needed to complete the continuous molding or forming process which imposes a limitation upon production rates or output of such sequential continuous manufacturing procedures.

The limitations of steam and of other prior art techniques, and the incentive of substantial savings through increased production rates, has for some years fostered the development of a variety of new curing means and systems by the industry. For example U.S. Pat. No. 1,757,053 proposed the circulation of a heated gas such as carbon dioxide to vulcanize rubber articles of substantial mass such as truck tires, U.S. Pat. No. 1,986,106 discloses passing a continuous length of rubber thread material into direct exposure with super heated steam, and U.S. Pat. No. 2,635,293 teaches circulating combustion gas from a burner over curable rubber products. U.S. Pat. Nos. 3,513,228 and 3,635,621 each teach the application of radiant heat to a curable product contained within a pressurized inert gas atmosphere, and U.S. Pat. No. 3,645,656 discloses the use of a stagnant body of nitrogen under super atmospheric pressure as a heat transfer medium for the continuous curing of coated wire and cable, while other patents such as U.S. Pat. No. 2,952,870 illustrates the complexity of some of the apparatus heretofore developed for faster continuous curing.

Technical publications have also dealt with the continuing problem of improved curing measures, such as the 1958 edition of the R. T. Vanderbilt Rubber Handbook, pages 402 et seq., and an article entitled "The Continuous Vulcanization of Solid and Cellular Profiles" by C. H. Gregory in pages 66–74 of the September, 1966 Rubber Journal, wherein many different approaches and techniques are discussed including circulating heated gases through ovens at high velocities. Notwithstanding such unending efforts as shown by the prior art, the development of curing techniques and systems has not kept abreast of the advances in plastic forming procedures and technology in increasing production rates and in lower costs whereby the decidedly slower curing rates have retarded currently attainable product formation speeds in continuous systems of sequential product forming and curing with the result of substantial losses in production.

SUMMARY OF THE INVENTION

This invention comprises a method and means for appreciably accelerating the production curing rates for heat curable polymeric compositions, or compounds thereof, and of reducing the costs of manufacturing heat cured or thermoset products. The invention is based upon the discovery that curing rates for heat induced cures in polymers can be markedly accelerated, and thus overall production increased and costs reduced, by applying a gaseous heat transfer medium, such as a stream of gas at high temperatures, in direct contact flowing over a surface of the body or mass of a curable polymeric composition, or the product formed thereof, moving at ultra high velocities and moderately increased pressures whereby the gas stream in effect penetrates through and/or drives away the thermally insulating static boundry layer or stagnant film of air or other gas molecules residing on or about the surface of the body or mass of polymeric composition, or which may be retained entrapped thereon by tubulant flow patterns such as eddy currents due to an overpassing stream of moderate velocities. In other words, this invention comprises the application of heat carried or transmitted by gas convection at such temperatures, pressures and very high velocities, to the surfaces of the article to be cured so as to effectively sweep away substantially all intermediate air or gas molecules residing between the moving hot fluid stream and the article surface which otherwise would in effect function as an intermediate insulating blanket or heat barrier of static air or gas enveloping the surface of the polymeric composition to be cured and thereby obstructing efficient heat transfer through the mechanism of gas convection.

OBJECTS OF THE INVENTION

It is a primary object of this invention to accelerate the rate of effecting heat activated cures in polymeric compositions, and compounds or products comprising the same.

It is also an object of this invention to increase the rate of heat transfer and in turn achieve a faster rate of curing heat curable or thermosetting compositions, and compounds comprising the same, and thereby lower manufacturing costs through increased production without incurring the need for very costly and intricate or extensive production curing apparatus.

It is a specific object of this invention to attain a cure rate of at least several times faster over that achieved with saturated steam and which also obviates the high pressures and mositure penetration handicaps of steam.

It is a still further object of this invention to provide a very rapid and effective heat induced cure thereby enabling very high, continuous tandem production rates comprising sequential extrusion forming and heat curing, all without expensive and complicated apparatus or systems.

It is a still further object of this invention to achieve maximum practical rates and efficiency in heat transfer through convection from a heated gas medium to the surface of the body of polymeric material and in turn rapid full heat penetration throughout its mass at minimum residence time.

BRIEF DESCRIPTION OF THE DRAWING

The drawings comprise graphs illustrating relative exemplary cure times or hot modulus strengths for varying conditions of gas temperatures and velocities.

DESCRIPTION OF PREFERRED EMBODIMENT

Figure 2:
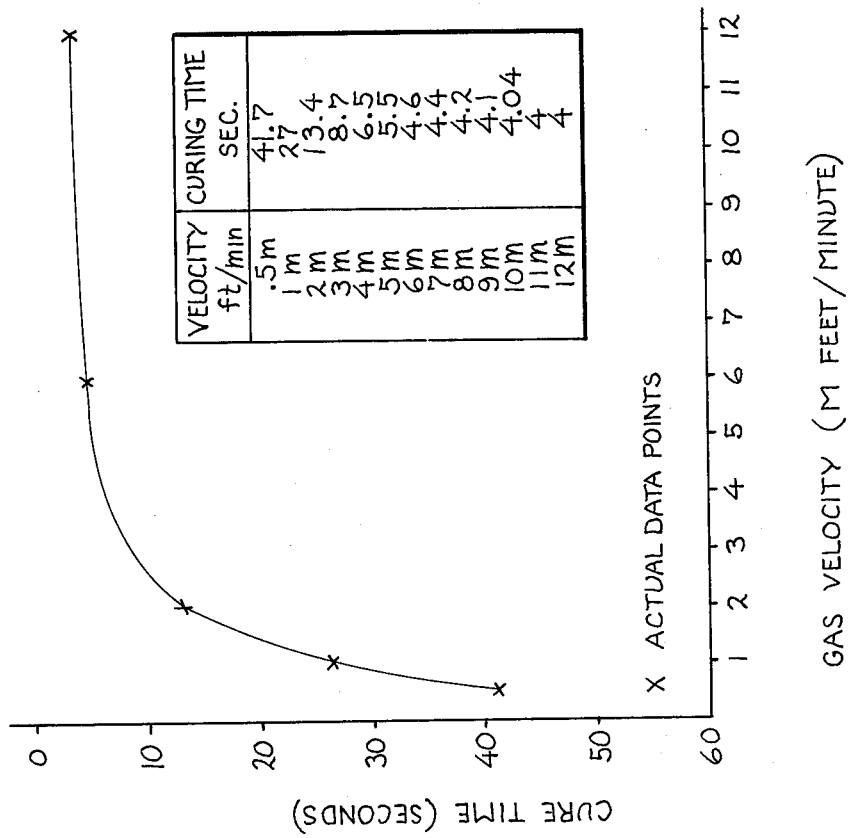

This invention comprises the discovery that optimum curing rates for effecting heat induced cures in cuable polymeric compositions, and compounds or products comprising the same, due to optimum heat transfer efficiency from a heated ambient gas atmosphere to the surface of a body exposed in physical contact with such a heat carrying gas, can be achieved by applying and flowing the heated gas over a surface of the curable material under moderate pressures and at very high velocities of at least 3,000 feet per minute, typically at velocities of within the range of about 5,000 to about 12,000 feet per minute, and preferably from about 6,000 to about 10,000 feet per minute.

The temperature of the heated gas for accelerating typical heat incited cross-linking or vulcanizing curing systems of polymeric materials should comprise at least about 450° F (232° C), and preferably about 600° F (316° C) up to about 1000° F (538° C), for optimum effectiveness with most common polymeric compositions. However, the temperatures of the heat carrying gas and/or dwell period or time of exposure to such gas temperatures should be adjusted, if need be, to compliment the characteristics of particular polymeric compositions undergoing curing so that the required temperature level for the cure is quickly attained throughout the polymer mass and the heat induced cure is thereby rapidly achieved therethrough without surface or localized overheating and deterioration which is a common hazard with some compositions such as halogen-containing polymers. For instance, a gas temperature as low as 425° F (218° C) may be desirable for the curing of certain halogen-containing polymers, such as polyvinyl chloride, to ensure against, or minimize the possibility of a heat induced deterioration of such polymers which results in the degradation of the polymer itself and/or the consequential emission of a halide or hydrogen halide decomposition product, such as hydrogen chloride, with its corrosive effects.

Other than such a necessary exception for polymers which are particularly vulnerable at high temperature, the temperature of the gas should be at least about 500° F (260° C), and preferably higher, to maximize the achievement of a primary objective of the invention, the acceleration of the effectuation of heat induced cures.

The pressure requirements of the heated gas of the high velocity curing system of this invention are generally moderate and need only be about three atmospheres (45 psi) in most applications, and generally pressures within the preferred range of about 75 to 200 lbs. per square inch will produce substantially non-porous and uniform cured products with most common polymeric compositions.

The term or dwell period for subjecting a surface of the curable polymeric composition, or products composed thereof, to the direct contact of the hot, pressurized stream of gas flowing thereover at ultra high velocities, should be of sufficient duration to cause an increase in the temperature substantially throughout the mass of the curable polymeric composition, or product thereof, to induce an adequate degree of curing therethrough. Thus the term or dwell period of exposure of a heat curable polymer stock to the specified conditions of high gas velocity, temperature and pressure of this invention, is dependent upon the thickness or mass and exposed surface area of the curable polymer body undergoing curing.

The efficiency and high rate of heat transfer from the circulating gas to the curable polymeric compositions attained with this invention and the very high curing capacities achieved thereby, are especially advantageous when applied in production systems with uninterrupted tandem production line facilities comprising a continuous extrusion molding or forming operation combined in operating sequence with a continuous curing operation for the manufacture of articles or extended or indeterminable lengths such as disclosed in U.S. Pat. Nos. 2,952,980 and 2,948,020. Thus, by means of this invention the curing phase of such continuous sequential manufacturing operations can be substantially increased and adjusted in rate to accept and handle the very high production forming rates obtainable with contemporary extrusion apparatus.

Apparatus suitable for carrying out this invention may include many different embodiments. However, the invention is most conveniently and effectively performed within the confines of an elongated curing chamber or housing such as may be provided by a section of pipe of appropriate diameter to accommodate the article or body undergoing curing and the enveloping pressurized high velocity gas stream, and of a length to provide the needed residence or dwell time therein at a particular speed or rate of travel of the curable material therethrough to achieve the required degree of heat transfer from exposure to the hot, pressurized, fast moving gas to raise the temperature to the designed level throughout the mass of material to effect a substantial cure therethrough. Typically, although not always necessarily, the confined curing area will be connected with or simply extended to provide a cooling unit or area which most expediently comprises a similar elongated chamber or housing containing cooling means such as a cooling fluid, the most practical of which comprises water. Cooling is normally desirable to prevent internal gasing and/or expansion of the mass of the material upon exposure to atmospheric temperatures and pressures. Thus, the overall curing apparatus may include a long section of pipe, or similar enclosure, comprising a heat curing area wherein a stream of hot gases is passed under pressure at velocities of at least 3000 feet per minute, and which extends therefrom directly, or through an intermediate section, into a water leg or area containing a cooling liquid. The heating area or section of the pipe or continuous chamber is appropriately connected with a suitable source of gas under pressure, heating means for the gas, and suitable means for including an ultra high velocity gas flow such as fans or blowers. The cooling area or section of the pipe or chamber is provided with the necessary cooling fluid transmitting conduits. Also, it is desirable if means are provided for the recirculation of the heated gas for reasons of economy, especially when the heat carrying gas is other than air.

The following comprises specific illustrations of the application of this invention to the manufacture of peroxide cross-link cured polyethylene and other polymer compositions for electrical insulation coverings extruded about a metallic conductor.

EXAMPLE I

The cross-link curable polyethylene insulating compound employed in the following illustrations comprised, in relative parts by weight: 100 - polyethylene; 50 - calcined clay filler; 5 - carbon black; 3.5 - di-α-cumyl peroxide (Hercules Di-Cup); and 1.75 - polytrimethyldihydroquinoline antioxidant (Monsanto Flectol H). This compound was continuously extrusion formed onto a moving core of a solid copper conductor, No. 14 AWG, in two different product thicknesses of 0.030 inch and 0.047 inch. The insulated wire product with the 0.030 inch thick layer of uncured polyethylene composition was continuously moved from the forming extruder directly into and through an ultra high velocity gas curing system at a rate of about 70 feet per minute, and the product with the 0.047 inch thick layer of uncured polyethylene composition was continuously moved from the forming extruder directly into and through the same cure system at a rate of about 145 feet per minute. The cure system or apparatus consisted of a 1 inch internal diameter pipe in three 10 foot sections connected together to provide first an ultra high velocity gas curing section of 10 foot length, an intermediate pressure gas lock section, and a cooling water leg of 10 feet length.

The heating gas, nitrogen, in each run was heated to a temperature of 600° to 700° F by means of Calrod electrical resistance heating elements and circulated by means of fans through the first 10 foot curing section at a pressure of about 125 lbs. per square inch guage and a velocity of about 10,000 feet per minute in direct contact flowing over the surface of the peroxide containing polyethylene compound formed about the wire core as it continuously passed therethrough. Circulation of the hot gas at moderate pressures and an ultra high velocity was along the 10 foot curing section in the same direction of tracel as the insulated wire undergoing rapid cure, and the cycle was completed by a return conduit passing through a fan blower and heater to maintain the temperature-pressure-velocity curing conditions. However, the direction of contact of the heated gas and curable material, whether concurrent or countercurrent, is not critical.

The cure times for each thickness of the insulation and other data, together with the cure times for the same polyethylene insulated wire product obtained with steam as a standard, were as follows:

| Polyethylene Insulation Wall Thickness | Approx. Gas Cure Time | Steam (400° F) Cure Time |
|---|---|---|
| 0.047 in. | 8 sec. | 48 sec. |
| 0.030 in. | 4–5 sec. | 43 sec. |

These examples demonstrate a cure rate of 6 to 10 times faster than steam.

EXAMPLE II

An additional demonstration of the very fast heat curing rates provided by this invention is given by the following examples and data. The heat curable polymeric composition employed comprised, in relative parts by weight: 100 - polyethylene; 35 - calcined clay; 0.35 — silicone tetramer; 1.2 - antioxidant (polymerized 1,2-dihydro-2,2,4 — trimethylquinoline); 1.0 — di-α-cumyl peroxide curing agent; and 2.5 di-t-butyl peroxide curing agent.

This heat curable compound was continuously extruded on a 14 AWG copper conductor as a coating having a thickness of about 0.045 inch and immediately thereafter continuously moved at the same rate from the extrusion forming operation through a curing pipe or chamber followed by an intermediate section or pressure lock and a cooling section or unit. A steam heated curing chamber was used as a standard for comparison, and a gas heated curing chamber operated according to the temperature-velocity-pressure conditions of this invention was applied under the same conditions, except as noted, for the continuous curing of the heat curable polymeric compound extrudate about the copper conductor passing therethrough. The curing conditions for each of the steam standard and the high velocity system of this invention are given in the table for comparison. The degree of cure achieved in each case was determined by the percentage of toluene solvent extraction from the cured product according to ASTM D-297.

The relative conditions of curing and extent of curing were as follows:

| | Residence Time Sec. | Gas Temp. ° F | Gas Pressure psig | Gas Velocity ft./min. | Degree of Cure % Extraction |
|---|---|---|---|---|---|
| Standard Steam | 45 | 392 | 211 | — | 11.5 |
| Invention High Velocity Nitrogen Gas | 6 | 650 | 125 | 10,000 | 10.4 |

The comparative data demonstrates that the system of this invention achieves at least an equivalent or better degree of curing in the same material at a rate of about 7 times faster over the use of steam which comprises the industry standard. Thus, through the use of the curing system of this invention one could increase production rates up to about 7 times faster. Moreover, the pressure of the system of this invention is significantly less than that of the steam system which provides an extra savings in equipment as well as reducing the cure time about 7 fold.

The following examples demonstrate the pronounced effect upon cure time or the degree of cure of the velocity or rate of flow of the hot, pressurized gaseous medium moving in direct contact over a surface of the curable material, and illustrates the scope of the invention. In these examples, the velocities of the hot gas, given in units of thousands (M) of feet per minute, are plotted against measured cure times in seconds, or hot moduli which is gauge of the degree of cure achieved within a given period, and illustrated in the graphs of the drawings comprising FIGS. 1 through 5.

EXAMPLES III and IV

Two separate runs were made wherein the following curable compound was extruded as an insulating covering around a solid 14 AWG copper conductor in a wall thickness of about 0.030 inch. The compound, in relative parts by weight, consisted of:

|  | Parts By Weight |
|---|---|
| Polyethylene | 100 |
| Clay Filler | 35 |
| Dimethylsilicone | 0.35 |
| Antioxidant-polydihydrotrimethylquinoline | 1.0 |
| Peroxide Curing Agent | 3.50 |
| di-cumyl peroxide 1.00 | |
| di-tertiary butyl peroxide 2.50 | |

In each run, the conductors insulated with a covering of the foregoing curable polymeric compound, were continuously passed through a curing chamber ten feet in length at a rate of 145 feet per minute thereby providing a dwell period therein of about four seconds. While passing a length of the insulation covered conductor through the chamber, nitrogen gas at a temperature of approximately 617° F (325° C) and pressure of about 125 pounds per square inch was forced through the curing chamber moving in direct contact over the outer surface of the insulation covering of curable polymeric compound about the conductor. The gas temperature and pressure were maintained constant through the entire run, and the velocity of the hot, pressurized gas was progressively increased from about 500 feet per minute up to about 12,000 feet per minute in several increments for the purpose of establishing the effect of the gas velocity upon the rate or time of cure. Cure time for the polymeric compound when exposed to the gas at constant temperature and pressure was determined at several different velocities of contact with the curable compound, and the time was plotted with the corresponding velocity of the gas.

The time for curing of a curable polymeric compound is relatively proportional to the proportion or percent of polymer which remains soluble in hot toluene, and cure time is thus calculated from measuring the amount of hot toluene extractable polymeric material.

Figure 1:
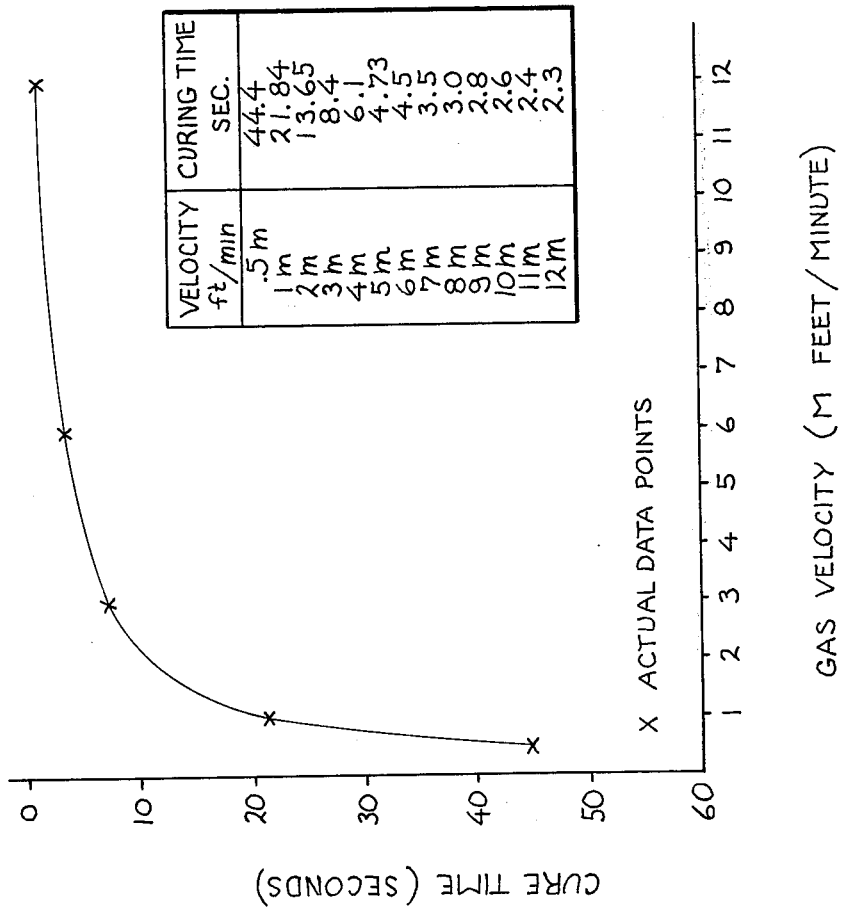

The data derived from both curing runs under the above conditions including different or increased gas velocities, was plotted as cure time in seconds with respect to the corresponding gas velocity of the cure given in thousands (M) of feet per minute, and is presented as a curve in the graphs of FIGS. 1 & 2, along with tables of gas velocities and the corresponding cure times.

EXAMPLE V

The heat curable polymeric compound employed in this example of the invention consisted of the following in relative parts by weight:

|  | Parts By Weight |
|---|---|
| Polyethylene | 100 |
| Clay Filler | 50.5 |
| Carbon Black | 5 |
| Antioxidant-polydihydrotrimethylquinoline | 1.75 |
| Di-Cumyl Peroxide Curing Agent | 3.55 |

This curable compound was extruded as an insulating covering on a seven strand, 14 AWG conductor in a wall thickness of about 0.045 inch. The curable insulation thus formed was heated to induce a cure therein by advancing the covered conductor through a 10 foot long curing chamber at a constant rate of 60 feet per minute. Nitrogen gas at a temperature of approximately 500° F (260° C) under a pressure of 125 pounds per square inch was passed through the curing chamber flowing over the surface of curable insulation covering at progressively increasing velocities of from one thousand (M) feet per minute up to six thousand (M) feet per minute to effect the cure.

Samples of the curable insulating compound which had been heat treated with the hot, pressurized gas at several different flow velocities were taken and tested to determine their hot modules as a criterion of their degree of cure. Hot modulus measurements in pounds per square inch of the heat treated insulation of the curable polymeric compound were made with the material of the samples at a temperature of 302° F (150° C) and extended to 100 percent elongation. The hot modules determinations in pounds per square inch of the samples of this example with respect to the particular velocity of the gas given in thousands (M) of feet per minute applied during this curing, were plotted in the graph shown in FIG. 3 of the drawing.

EXAMPLE VI

The heat curable polymeric compound employed in this example consisted of the following ingredients in relative parts by weight:

|  | Parts By Weight |
|---|---|
| Polyethylene | 100 |
| Clay Filler | 53.21 |
| Antioxidant-polydihydrotrimethylquinoline | 1.84 |
| Di-Cumyl Peroxide Curing Agent | 4.85 |

This curable polymeric compound was extruded as an insulating covering on a 19 strand 14 AWG conductor in a wall thickness of about 0.030 inch. The conductor with the curable insulating covering thereon was passed through a curing chamber 10 feet in length at a constant rate of 60 feet per minute while nitrogen gas at a temperature of approximately 500° F (260° C) and pressure of about 125 pounds per square inch was passed over the surface of the moving insulation at several different velocities of flow ranging from one thousand (M) feet per minute up to six thousand (M) feet per minute as the only variable to show the influence of the velocity of the gas.

Samples of the insulating compound which had been identically heat cured except for the application of the gas at several different viscosities as shown were taken and tested to measure their hot modulus as an indicator of the degree of cure produced in each at different gas velocities. As before, the hot modulus measurements were made with the samples at a temperature of 302° F (150° C) and at 100% elongation. The relative degree of cure as exemplified by the hot modulus in relation to the velocity of the gas while curing is shown in the graph of FIG. 4 of the drawing wherein the hot modulus in pounds per square inch of the samples was plotted against the velocity of the gas given in thousands (M) of feet per minute.

EXAMPLE VII

The heat curable polymeric composition employed in this example of the practice of the invention included generally heat sensitive or decomposable halogen-containing polymers, and specifically consisted of the following components in relative parts by weight:

|  | Parts By Weight |
|---|---|
| Polyethylene | 39 |
| Chlorinated Polyethylene | 30.5 |
| Polyvinyl Chloride | 30.5 |
| Basic Lead Silicate Stabilizer | 20 |
| Clay Filler | 14 |
| Antimony Oxide | 1.5 |
| Calcium Stearate | 1.0 |
| Carbon Black | 0.4 |
| Antioxidant-polymerized trimethyldihydro-quinoline | 1.25 |
| Di-Cumyl Peroxide Curing Agent | 4.25 |

The curable halogen-containing polymer compound was extrusion molded as an insulation covering on a 19 strand 14 AWG conductor with a wall thickness of about 0.030 inch. The curable insulation covering was heated to promote a cure therein by continuously passing the insulation covered conductor through a curing chamber 10 feet in length at a constant rate of travel of about 80 feet per minute.

Nitrogen gas at a relatively low temperature of approximately 450° F (232° C) to preserve the chemical integrity of the halogen containing polymer constituents, was passed through the chamber flowing over the surface of the curable polymer compound at a pressure of about 125 pounds per square inch and at several different velocities ranging from 1000 (M) feet per minute up to 7000 (M) feet per minute.

As in Examples V and VI, samples of the polymeric compound cured at the several different gas velocities were taken and tested to ascertain the influence of gas velocity, coupled with temperature and pressure, upon the degree of cure achieved. The samples were tested by determining their hot modulus while at a temperature of 302° F (150° C) and extended to 100 percent elongation. The relation of hot modulus representing degree or extent of cure achieved within a given period of time, to the velocity of the gas medium flowing over the curing polymer composition, is illustrated by plotting the hot modulus in pounds per square inch and the corresponding curing gas velocity in thousands (M) of feet per minute in the graph of FIG. 5 of the drawing.

Figure 5:
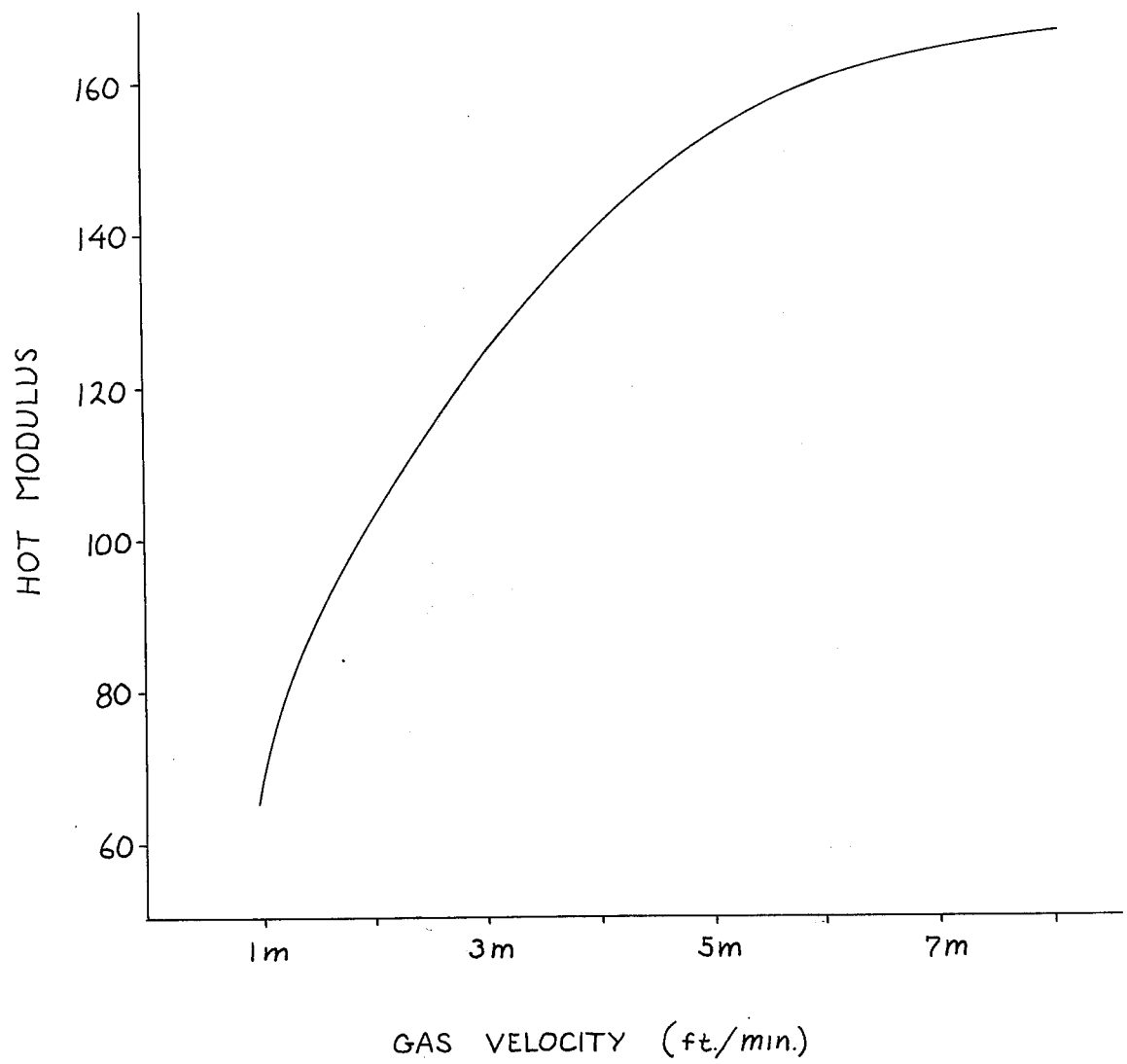

These Examples and the data derived therefrom which has been illustrated in the several graphs of the drawings vividly demonstrates the significant effects of the gas velocity, in combination with the gas temperature and pressure, upon the rates of curing of polymeric compositions or compounds comprising the same. This phenomenon is shown by the pronounced drop and improvement in cure time achieved by increasing the velocity of the gas at least to above 3000 feet per minute and preferably more than about 5000 feet per minute and is graphically illustrated by the data shown in FIGS. 1 and 2 from the runs of Example 3, and also by the high levels of cure manifested by the high hot modulus properties obtained within relatively brief constant curing periods when effected with the high gas velocities of this invention, i.e., above 3000 feet per minute, as shown in the graphs of FIGS. 3, 4 and 5, plotted from the data of Examples V, VI, and VII, respectively.

Although nitrogen comprises perhaps the best all around gas composition for the heat transfer medium in the practice of this invention because of its relatively low cost and generally inert properties with respect to most elastomer and polymer compositions, as well as being normally non-toxic and non-corrosive, other gases can be utilized, including for example, air, carbon dioxide, argon, and the like. However, the gas should be relatively inert chemically or non-reactive with respect to the particular polymeric composition being cured so as not to degrade the composition or product thereof since the mechanism of this invention requires direct exposure of the polymer material to the gas to obtain the primary advantage of substantially accelerated curing rates through more rapid and effective heat transfer.

The hot, pressurized and ultra high velocity gas stream curing conditions and accelerated rates of curing through the improved heat transfer attributable thereto of this invention, are generally applicable to effect heat induced cures for polymeric type material generally, and including hydrocarbon polymers or elastomers of a relatively high degree of unsaturation such as natural and common synthetic rubbers through the medium of conventional sulfur-accelerated curing system, and also those of relatively low degrees of unsaturation such as polyethylene and similar polyolefins requiring peroxide type curing systems which form free radicals upon thermal decomposition to effect a cross-linking between polymer chains. This latter system of peroxide free radical effected cure is more fully described in U.S. Pat. Nos. 2,888,424 and 3,079,370 and others, and this invention is particularly applicable thereto. Specifically included are homopolymers of ethylene or polyethylene, copolymers of ethylene and other polymerizable materials such as vinyl acetate and propylene, and blends of polyethylene and other polymers, either filled or unfilled. Halogen-containing curable polymers can also be effectively cured by the method of this invention, including for example, polyvinyl chloride, chlorinated polyethylene, and chlorosulfonated polyethylene.

This invention is particularly useful and advantageous for the very rapid heat curing, such as within about 1 to about 10 seconds, of continuously produced products including heat curable polymeric compositions or compounds thereof in elongated bodies or units, for example about 0.001 inch to about 0.10 inch in unit or wall thickness, which are manufactured at high production rates entailing the fast movement of the materials or product formed thereof, such as about 50 up to about 500 feet per minute.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. A method of accelerating the rate of effecting a cure in heat curable polymeric compositions by increasing the effectiveness of heat transfer from a gas heating medium to a heat curable polymeric compound, comprising contacting a surface of a body of heat curable polymeric composition with a stream of hot gas heated to a temperature of about 500° F to about 1000° F and flowing in contact over the surface of said body at a velocity of at least 3000 up to about 12,000 feet per minute while said gas is under a pressure of at least about 45 up to about 200 lbs. per square inch within the confines of an elongated curing chamber, and flowing said stream of heated gas moving under pressure at a velocity of at least 3000 up to about 12,000 feet per minute in direct contact over the surface of the body of heat curable polymeric composition for a dwell period sufficient to raise the body of heat curable polymeric composition substantially throughout its mass to its curing temperature and thereby effecting a substantial cure of the polymeric composition.

2. The method of claim 1, wherein the stream of gas contacting a surface of the body of heat curable polymeric composition is heated to a temperature within the range of about 600° to about 1000° F.

3. The method of claim 2, wherein the heated gas stream contacting a surface of the body of heat curable polymeric composition is flowing at a velocity within the range of about 5000 to 12,000 feet per minute.

4. The method of claim 3, wherein the heated gas stream contacting a surface of the body of heat curable polymeric composition is under a pressure of within the approximate range of about 75 to about 200 lbs. per square inch.

5. The method of claim 4, wherein the heated gas comprises nitrogen.

6. The method of claim 5, wherein the heat curable polymeric composition comprises at least one cross-linkable ethylene polymeric material selected from the group consisting of homopolymers of ethylene, copolymers of ethylene and other polymerizable materials, and blends of polyethylene and other copolymers.

7. The method of claim 6, wherein the polymeric composition is cross-link cured with a tertiary peroxide.

8. The method of claim 4, wherein the polymeric composition comprises an electrical insulation formed about an elongated conductor.

9. The method of claim 4, wherein the polymeric composition comprises a covering on a wire.

10. A method of continuously effecting a rapid heat induced cure in heat curable polymeric compositions by increasing the effectiveness of heat transfer from a gas heating medium to a heat curable polymeric compound, comprising continuously moving a body of heat curable polymeric composition through an elongated enclosure while passing in direct contact over a surface of said body of the heat curable polymeric compound, a stream of gas heated to a temperature of about 500° F to about 1000° F flowing at a relative velocity of at least 3000 up to about 12,000 feet per minute and under a pressure of at least about 45 lbs. per square inch, and flowing said stream of heated gas moving under pressure at a velocity of at least 3000 feet per minute in direct contact over the surface of the body of heat curable polymeric composition for a dwell period sufficient to raise the body of heat curable polymeric composition substantially throughout its mass to its curing temperature and thereby effecting a substantial cure of the polymeric composition.

11. The method of claim 10, wherein the stream of heated gas is passed in contact over the surface of the heat curable polymeric composition at a velocity of about 5000 to about 12,000 feet per minute.

12. The method of claim 11, wherein the gas stream contacting a surface of the body of heat curable polymeric composition is heated to a temperature within the range of about 600° to about 1000° F.

13. The method of claim 12, wherein the heated gas stream contacting a surface of the body of heat curable polymeric composition is under a pressure of within the approximate range of about 75 to about 200 lbs. per square inch.

14. The method of claim 12, wherein the heated gas is nitrogen.

15. The method of claim 14, wherein the curable polymeric composition comprises at least one cross-linkable ethylene polymeric material selected from the group consisting of homopolymers of ethylene, copolymers of ethylene and other polymerizable materials, and blends of polyethylene and other polymers.

16. The method of claim 14, wherein the polymeric composition is cross-link cured with a tertiary peroxide.

17. A method of continuously effecting a rapid heat induced cure in heat curable polymeric compositions covering elongated conductors by increasing the effectiveness of heat transfer from a gas heating medium to a heat curable polymeric compound, comprising continuously moving an elongated conductor covered with a heat curable polymeric composition through an elongated curing chamber, passing a stream of gas heated to a temperature of about 500° F up to about 1000° F through said elongated curing chamber and flowing in direct contact over a surface of said covering of heat curable polymeric composition at a relative velocity of at least 3000 up to about 12,000 feet per minute and at a pressure of at least about 45 lbs. per square inch, and flowing said stream of heated gas moving under pressure at a velocity of at least 3000 up to about 12,000 feet per minute in direct contact over the surface of the covering of heat curable polymeric composition for a dwell period sufficient to raise the covering of heat curable polymeric composition substantially throughout its mass to its curing temperature and thereby effecting a substantial cure of the polymeric composition.

18. The method of claim 17, wherein the heated gas stream contacting a surface of the covering of heat curable polymeric composition is at a temperature within the range of about 600° to about 1000° F and passed over said surface of the covering of heat curable polymeric composition in contact therewith at a velocity of about 5000 to about 12,000 feet per minute and at a pressure of within the range of about 75 to about 200 lbs. per square inch.

19. A method of continuously producing an elongated electrical conductor insulated with a covering of cured polymeric composition, comprising the steps of continuously forming a covering of heat curable polymeric composition about an elongated conductor and in tandem sequence therewith, continuously curing said heat curable polymeric composition covering at an accelerated rate by increasing the effectiveness of heat transfer from a gas heating medium to the heat curable polymeric compound, comprising continuously moving said formed heat curable covering about the conductor through an elongated curing chamber and therein contacting a surface of the heat curable covering with a stream of hot gas heated to a temperature of about 500° up to about 1000° F and flowing at a velocity of at least 3000 up to about 12,000 feet per minute while said gas is under a pressure of at least about 45 lbs. per square inch, and flowing said stream of heated gas moving under pressure at a velocity of at least 3000 up at about 12,000 feet per minute in direct contact over the surface of the heat curable covering for a dwell period sufficient to raise the heat curable covering substantially throughout its mass to its curing temperature and thereby effecting a substantial cure of the curable polymeric composition covering about the conductor.

20. The method of claim 19, wherein the heat curable polymeric composition comprises at least one crosslinkable ethylene polymeric material selected from the group consisting of homopolymers of ethylene, copolymers of ethylene and other polymerizable materials, and blends of polyethylene and other polymers.

21. The method of claim 20, wherein the heated gas stream contacting the surface of the covering of heat curable polymeric composition is at a temperature within the range of about 600° to about 1000° F and flowing over said surface of the heat curable polymeric composition at a velocity of about 5000 to about 12,000 feet per minute and at a pressure of within the range of about 75 to about 200 lbs. per square inch.

22. A method of continuously producing an elongated electrical conductor insulated with a covering of cured polyethylene composition, comprising the steps of continuously extrusion forming a covering of heat curable polyethylene composition about an elongated conductor in a thickness of about 0.03 to about 0.47 inch and in tandem sequence with said extrusion forming, continuously curing said heat curable polyethylene composition covering at an accelerated rate by increasing the effectiveness of heat transfer from a gas heating medium to the heat curable polyethylene compound, comprising continuously moving said formed heat curable covering about the conductor through an elongated curing chamber at a rate of about 70 feet per minute and therein contacting the surface of the heat curable covering with a stream of hot gas heated to a temperature of about 600° to about 1000° F flowing over said surface at a velocity of about 6000 to about 10,000 feet per minute while said gas is under a pressure of about 75 to about 200 lbs. per square inch, and flowing said stream of heated gas under pressure at a velocity of about 6000 to about 10,000 feet per minute in direct contact over the surface of the heat curable covering for a dwell period sufficient to raise the heat curable covering substantially throughout its mass to its curing temperature and thereby effecting a substantial cure of the heat curable polyethylene composition covering about the conductor.

23. A method of accelerating the rate of effecting a cure in heat curable polymeric compositions by increasing the effectiveness of heat transfer from a gas heating medium to a heat curable polymeric compound, comprising contacting a surface of a body of heat curable polymeric composition with a stream of hot gas heated to a temperature of at least about 450° F and flowing in contact over the surface of said body at a velocity of at least 3000 feet per minute while said gas is under a pressure of at least about 45 lbs. per square inch, and flowing said stream of heated gas moving under pressure at a velocity of at least 3000 feet per minute in direct contact over the surface of the body of heat curable polymeric composition for a dwell period sufficient to raise the body of heat curable polymeric composition substantially throughout its mass to its curing temperature and thereby effecting a substantial cure of the polymeric composition.

24. The method of claim 23, wherein the heated gas stream contacting a surface of the body of heat curable polymeric composition is flowing at a velocity within the range of about 5000 to about 12,000 feet per minute.

25. The method of claim 24, wherein the heated gas stream contacting a surface of the body of heat curable polymeric composition is under a pressure of within the approximate range of about 75 to about 200 lbs. per square inch.

26. The method of claim 25, wherein the heated gas comprises nitrogen.

27. The method of claim 23, wherein the heat curable polymeric composition comprises a halogen-containing polymer.

28. The method of claim 23, wherein the polymeric composition comprises a covering on a wire.

29. A method of continuously effecting a rapid heat induced cure in heat curable polymeric compositions containing a halogen by increasing the effectiveness of heat transfer from a gas heating medium to a heat curable polymeric compound, comprising continuously moving a body of heat curable polymeric compound containing a halogen through an elongated enclosure while passing in direct contact over a surface of said body of the heat curable polymeric compound, a stream of gas heated to a temperature of at least 425° up to about 550° F flowing at a relative velocity of about 3000 to about 12,000 feet per minute and under a pressure of at least about 45 lbs. per square inch, and flowing said stream of heated gas moving under pressure at a velocity of at least 3000 feet per minute in direct contact over the surface of the body of heat curable polymeric composition for a dwell period sufficient to raise the body of heat curable polymeric composition substantially throughout its mass to its curing temperature and thereby effecting a substantial cure of the polymeric composition.

30. The method of claim 29, wherein the heat curable polymeric composition containing a halogen is polyvinyl chloride.

31. The method of claim 30, wherein the heated gas is nitrogen.

32. A method of continuously producing an elongated electrical conductor insulated with a covering of cured polymeric composition, comprising the steps of continuously forming a covering of heat curable polymeric composition about an elongated electrical conductor and in tandem sequence therewith, continuously curing said heat curable polymeric composition covering at an accelerated rate by increasing the effectiveness of heat transfer from a gas heating medium to the heat curable polymeric compound covering, comprising continuously moving said formed heat curable covering about the conductor through an elongated curing chamber and therein contacting a surface of the heat curable covering with a stream of hot gas heated to a temperature of at least about 450° F and flowing at a velocity of at least 3000 feet per minute while said gas is under a pressure of at least 45 lbs. per square inch, and flowing said stream of heated gas moving under pressure at a velocity of at least about 3000 feet per minute in direct contact over the surface of the heat curable polymeric covering for a dwell period sufficient to raise the heat curable polymeric covering substantially throughout its mass to its curing temperature and thereby effecting a substantial cure of the curable polymeric composition covering about the conductor.

33. The method of claim 32, wherein the heated gas stream contacting a surface of the covering of heat curable polymeric composition is flowing at a velocity within the range of about 5000 to about 12,000 feet per minute.

34. The method of claim 33, wherein the heated gas stream contacting a surface of the covering of heat curable polymeric composition is under a pressure of within the approximate range of about 75 to about 200 lbs. per square inch.

35. The method of claim 34, wherein the covering of heat curable polymeric composition includes polyvinyl chloride.

36. The method of claim 35, wherein the heated gas comprises nitrogen.

37. A method of continuously producing an elongated conductor insulated with a covering of cured polymeric composition containing a halogen, comprising the steps of continuously forming a covering of heat curable polymeric composition containing a halogen about an elongated electrical conductor and in tandem sequence therewith, continuously curing said heat curable polymeric composition covering at an accelerated rate by increasing the effectiveness of heat transfer from a gas heating medium to the heat curable polymeric compound covering, comprising continuously moving said formed heat curable covering about an electrical conductor through an elongated curing chamber and therein contacting a surface of the heat curable covering of polymeric composition containing a halogen with a stream of hot gas heated to a temperature of at least 425° F flowing over said surface at a velocity of about 5000 to about 12,000 feet per minute while said gas is under a pressure of about 75 to about 200 lbs. per square inch, and flowing said stream of heated gas moving under pressure at a velocity of at least about 5000 feet per minute over the surface of the heat curable polymeric covering for a dwell period sufficient to raise the heat curable polymeric covering substantially throughout its mass to its curing temperature and thereby effecting a substantial cure of the curable polymeric composition containing a halogen forming a covering about the conductor.

38. The method of claim 37, wherein the heat curable polymeric composition containing a halogen comprises polyvinyl chloride.

* * * * *